May 31, 1932.　　　R. ST. L. PEVERLEY　　　1,860,367
VENTILATOR
Filed Oct. 12, 1928　　　2 Sheets-Sheet 2

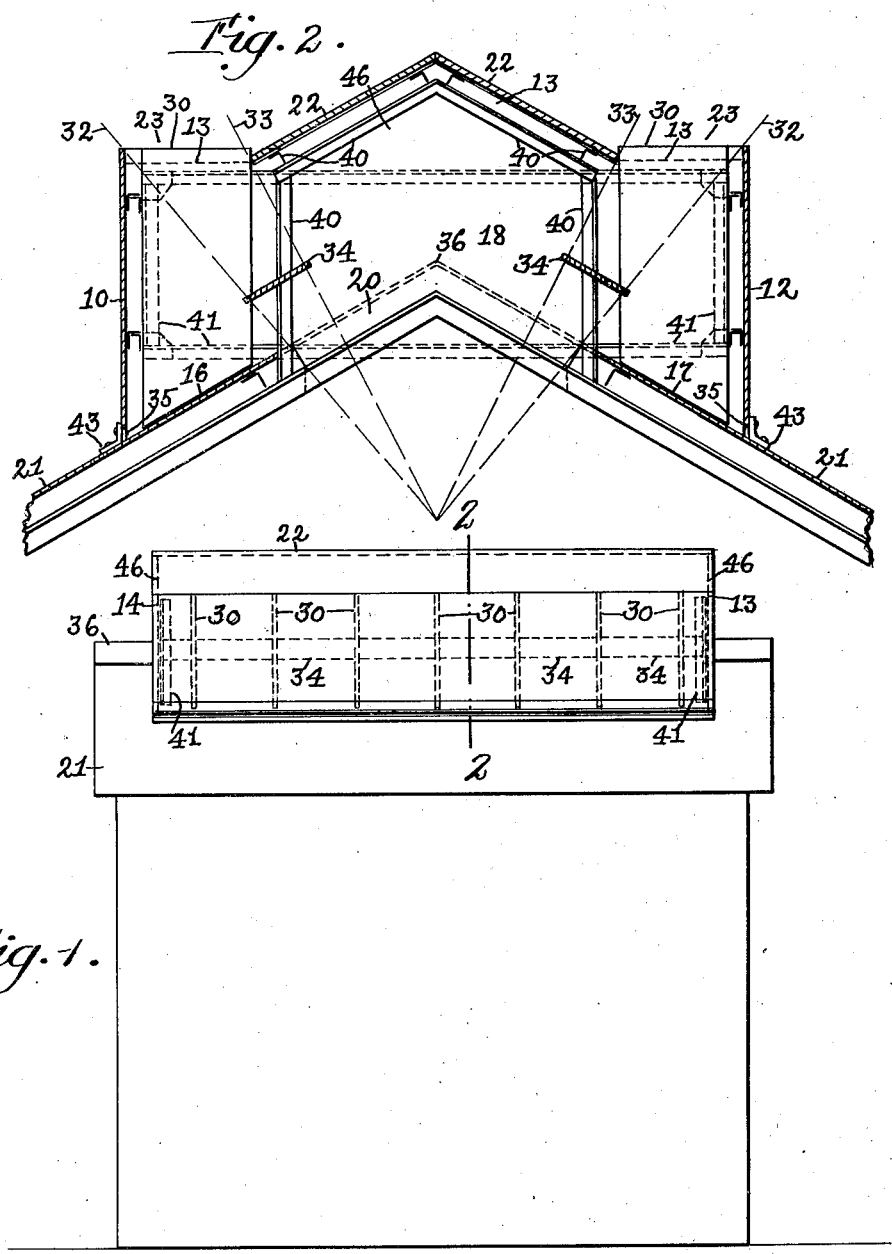

Inventor
Ralph St. Lawrence Peverley
by Jas. H. Churchill
atty.

Patented May 31, 1932

1,860,367

UNITED STATES PATENT OFFICE

RALPH ST. LAWRENCE PEVERLEY, OF CHESTER, ENGLAND, ASSIGNOR TO H. H. ROBERTSON COMPANY, OF PITTSBURGH, PENNSYLVANIA, A CORPORATION OF PENNSYLVANIA

VENTILATOR

Application filed October 12, 1928. Serial No. 311,992.

This invention relates to stationary ventilators of that character having a body portion provided with upright side and end members, and has for its object to provide a ventilator of this type which is efficient under all conditions of use, as will be described.

The invention also has for its object to provide an efficient ventilator of the type referred to, which can be made of any desired length and materially longer than it is wide and used as a continuous ventilator at the ridge of the roof of a building.

The invention further has for its object to provide a ventilator of the type referred to in which the external air is prevented from passing into the building in substantial volume through the ventilator.

The invention also has for its object to provide a ventilator having the advantageous characteristics above described which can be made as a unit capable of being applied to the roof of a building or which may be incorporated in the roof structure of the building.

To these ends, the ventilator is constructed so as to provide a chamber which is substantially closed below its top against the entrance of external air in material volume and is provided with a gas inlet in its bottom and with gas outlet passages at its top which are located on opposite sides of said gas inlet and are of substantial area, so that in the absence of wind outside of the ventilator a free outlet is afforded for gases under pressure within the building with which the ventilator is used, and in the presence of wind external to the ventilator, the said external wind is utilized to the maximum for pulling or sucking the gases out of the ventilator irrespective of the quarter from which the wind is blowing, as will be described. Provision is also made for preventing rain from passing into the building through the ventilator.

These and other features of the invention will be pointed out in the claims at the end of this specification.

In the drawings illustrating the invention,

Fig. 1 represents one form of building provided with a ridge ventilator embodying the invention.

Fig. 2 is a cross section on an enlarged scale taken on the line 2—2, Fig. 1.

Figure 3:
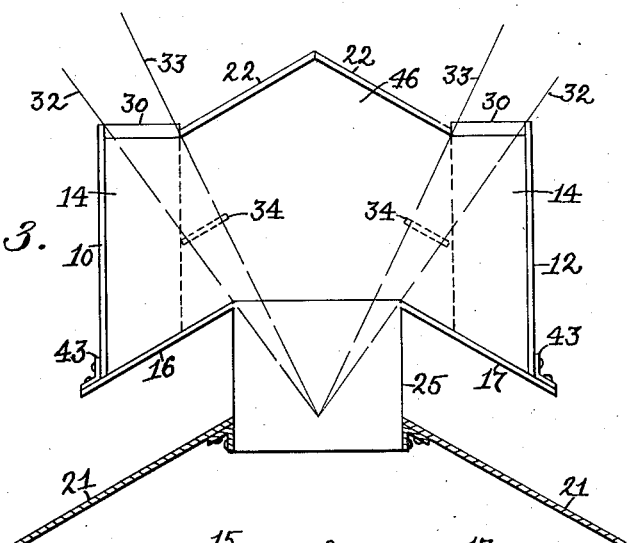
Fig. 3 is an end elevation of a smaller ventilator of the construction shown in Fig. 1, which is made as a unit separate from the building and applied thereto.
Figure 4:
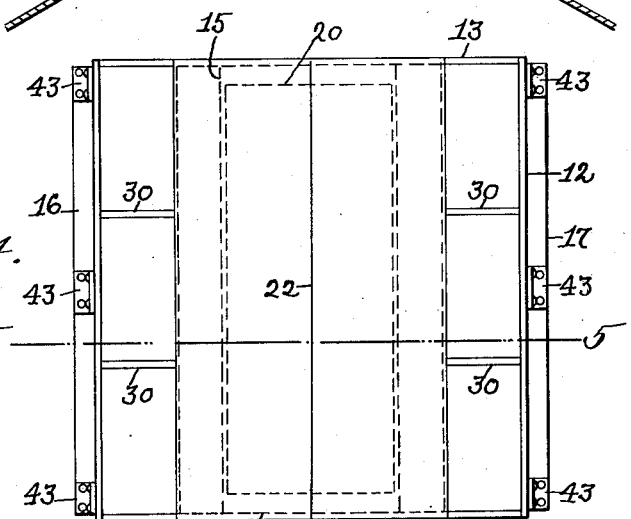
Fig. 4 is a plan view of the ventilator shown in Fig. 3, and Fig. 5 a diagrammatic view in cross section of the ventilators shown in Figs. 1 and 3 to enable the manner in which they operate to be readily understood.
Figure 5:
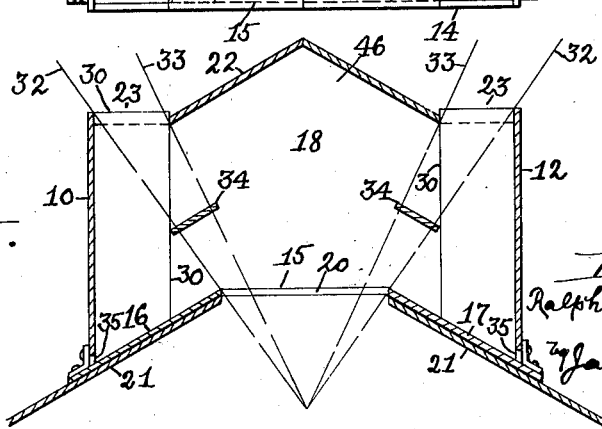

In Figs. 1 and 2 the improved ventilator is shown as embodied in the construction of the building whereas in Figs. 3, 4 and 5, the ventilator is shown as a unit capable of being manufactured separately and of being applied to the building.

To enable the invention to be clearly understood, the unitary construction shown in Figs. 3 to 5 will be first described.

The ventilator therein shown is substantially oblong in shape and is provided with a body portion having substantially parallel upright side walls or members 10, 12 and substantially parallel upright end walls or members 13, 14 which may be of any suitable material, metallic or non-metallic or combinations of the same.

The body portion is also provided with a bottom wall 15 herein shown as substantially conical-shaped in cross-section and provided with inclined sections or members 16, 17 which extend from substantially the longitudinal axis of the body portion toward the upright side walls 10, 12 and cooperate with the latter and with the end walls 13, 14 to form the bottom and upright walls of a chamber 18. The bottom wall 15 is provided with a gas inlet opening 20 designed to communicate with the building 21 to which the ventilator, when made as a separate unit, is applied.

The ventilator is provided with a cap member 22 substantially conical or Λ-shaped in cross section, which is located above the gas inlet opening 20 and serves to prevent rain falling vertically from passing into the building through the gas inlet opening 20. The cap member 22 extends substantially the length of the upright side walls or members 10, 12 and cooperates therewith to form gas outlet openings or passages 23 for the ventilator, which are of substantial width and extend substantially the length of the ventilator from end wall to end wall to afford a substantially large outlet area for the gases admitted into the ventilator through the gas inlet opening 20. The parts of the ventilator as thus far described are connected together to form a unitary structure in any suitable manner, and may be applied directly to the peaked roof of a building having an opening at its ridge with which the gas inlet opening 20 of the ventilator registers after the manner represented in Fig. 5, or said ventilator unit may be provided with a gas inlet pipe 25 of the same shape as the gas inlet opening 20, which enables the ventilator to be erected above the ridge of the roof and connected with the latter to communicate with the interior of the building. (See Fig. 3.)

The ventilator may and preferably will be made oblong in shape and of a length materially greater than its width, and such ventilator when erected upon the building operates effectively when the wind is blowing at an angle to the longitudinal axis of the ventilator, as in such case, the wind strikes either the side wall or member 10, or the side wall or member 12 and is deflected upwardly by said walls and creates a suction in the ventilator, which effectively draws the gases from the building, said gases passing out of the ventilator through the long and substantially wide outlet passages 23. When the wind is blowing in the direction of the length of the ventilator or at an angle to the end walls 13, 14 of the ventilator, the substantially oblong ventilator as thus far described is not as efficient as when the wind is blowing at right angles to the side walls. To render the substantially oblong ventilator of maximum efficiency under the wind conditions just described, the ventilator is provided with one or more baffle plates or members 30, which are located in the ventilator between the side walls or members 10, 12, and the side edges of the cap member intermediate the ends of the latter, and extend transversely of the gas outlet passages 23, and subdivide the latter into sections, each of which communicates directly with a common supply passage extended lengthwise of the ventilator and covered by said cap member, see Fig. 4.

The transverse baffle plates or members 30 may be made of metal, wood or other material and preferably of a length sufficient to rest upon the bottom member 15 and project above the portions of the end walls or members 13, 14 which are in line with the gas outlet passages 23. The number of transverse baffles used will depend upon the length of the ventilator. In Fig. 4 two transverse baffles 30 are shown, whereas in the ventilator shown in Fig. 1 seven are employed. These transverse baffles 30 act in the nature of hurdles for the wind blowing substantially horizontally lengthwise of the ventilator and cause said wind to be deflected upwardly and thereby create suction in individual sections of the outlet passages 23, and thus effectively remove the gases from the ventilator, when the wind is blowing lengthwise of the ventilator. The baffle members 30 are preferably insertable into the ventilator through the outlet passages 23 intermediate the ends of the cap member.

It will thus be seen that a ventilator having gas outlet passages of greater length than width provided with a transverse baffle or baffles 30 and extending above the end walls of said outlet passages, is efficient with the wind blowing from any quarter in a substantially horizontal direction. The gas outlet passages 23 are substantially wide and have a direct communication with the gas inlet opening 20 in the absence of an obstruction as indicated by the dotted lines 32, 33, and to prevent rain entering the ventilator from passing into the building through the gas inlet opening 20, one or more louvres or baffles 34 may be provided to offer a minimum obstruction to the passage of the gases out of the ventilator in a direct path and to deflect the rain toward the side walls 10, 12, which latter may be provided at their lower ends with one or more openings 35 through which the rain water may flow to the outside of the ventilator.

It will be observed that the ventilator is substantially closed at its bottom against the entrance of external air in any appreciable volume while providing for the outlet of rain water which may enter the ventilator at its top. It will also be observed that the external air flowing horizontally or upwardly from any direction is caused to be deflected upwardly over the gas outlet passages 23 and thereby create a maximum suction of the gases out of the ventilator. A ventilator of this character may be made as a portable unit and erected upon the pitched or flat roof of a building, or it may be used on stacks, chimneys or the like, but it is not desired to limit the invention in this respect, as it may be incorporated in the building itself. In the ventilator shown in Figs. 1 and 2, the roof 21 of the building is provided at its ridge 36 with the opening 20 which extends substantially the length of the ridge 36, and upon said roof above the opening 20 is erected the cap member 22 which is continuous and covers the gas inlet opening 20 for the entire length of the latter. Upon the roof 21 and on opposite sides of the opening 20 are erected the side walls or members 10, 12 and the end walls or members 13, 14 which cooperate with the side walls and with the portion of the roof between the side walls to form the chamber 18 of the ventilator. The portions of the roof between the side walls 10, 12 constitute the sections 16, 17 of the bottom of the chamber and the opening 20 constitutes the gas inlet opening for said chamber. The space between the cap member 22 and the side walls 10, 12 form the gas outlet passages 23 which are subdivided into sections by the transverse baffle plates or members 30 of which there are seven, as represented in Fig. 1. These baffles are located intermediate the ends of the cap member. Within the chamber 18 are certain structural parts, some of which marked 40 are employed to sustain the cap member 22, and others marked 41 to tie the side and end walls together, and as such structural parts are of known construction and constitute no part of the present invention, it is deemed unnecessary to describe the same in detail. Between the cap member 22 and the roof are the louvres or baffles 34. The side walls 10, 12 may be fastened to the roof by angle irons 43 or in any other suitable manner, and may be provided with the water outlets 35.

The end walls 13, 14 in both the unit ventilator shown in Figs. 3 to 5 and in the ventilator incorporated in the building may be provided with central upright extensions 46 which form closure members for the ends of the cap member 22 and prevent air entering the ventilator at the ends of the cap member, so that in the completed ventilator herein shown there is a body portion having a bottom, and a cap member cooperating with said body portion to form a chamber, which chamber has a gas inlet in its bottom and gas outlets at its top on opposite sides of said gas inlet and is practically closed below its top against the entrance of external air in any appreciable volume, so that the external air flowing in a substantially horizontal direction is practically excluded from the ventilator and effects a maximum suction of gases from the ventilator and the building or other structure with which it communicates. The cap member 22 in both embodiments of the ventilator preferably projects above the side walls and deflects upwardly currents of air flowing horizontally over the upper edge of the side walls 10, 12, which assists in creating suction within the ventilator. In the present instance, the ventilator is provided with a bottom having the oppositely inclined sections 16, 17 which enables the ventilator to be incorporated in the building as represented in Figs. 1 and 2, or to be made as a unit and applied to the ridge of the roof as represented in Fig. 5, but it is not desired to limit the invention in this respect, as the bottom of the ventilator may be made flat when incorporated in a flat roof or in a portable ventilator.

From the above description, it will be observed that a ventilator embodying this invention is provided with a chamber which is substantially closed below its top against the entrance of external air and is provided with a gas inlet in its bottom and with gas outlet passages in its top which are located on opposite sides of the gas inlet, and are of substantial area, so that in the absence of wind outside of the ventilator a free outlet is afforded for gases under pressure within the building with which the ventilator is used, and in the presence of horizontally flowing wind external to the ventilator, the said external wind is utilized to the maximum for pulling or sucking the gases out of the ventilator irrespective of the quarter from which the wind is blowing.

The improved ventilator may be used on any construction of building and may be any desired length, and is particularly useful on the ridge roofs of mills, railway stations, locomotive houses and the like where large quantities of gases, fumes, smoke and the like are present.

A preferred construction of ventilator embodying the invention is herein shown, but it is not desired to limit the invention to the particular construction shown.

What is claimed is:—

1. A ventilator for buildings and the like comprising an elongated body portion having substantially upright side and end walls or members and a bottom member cooperating to form a chamber open at its top and substantially closed at its bottom to the entrance into the said chamber of external air in material volume, said bottom member having a gas inlet opening for said chamber, a cap member located at the top of said chamber above said gas inlet opening and forming with said side walls gas outlet passages for said chamber, and a baffle member in said gas outlet passages arranged transversely of the latter between said upright side walls and the sides of the cap member intermediate the ends of the latter and extended above the end walls of said gas outlet passages and for a substantial distance below the sides of the said cap member.

2. The combination with a building having a roof provided with an opening, of a cap member for said opening located above said roof, upright walls erected upon said roof on opposite sides of said opening and separated from said cap member to form gas outlet passages, upright walls for closing said gas outlet passages at their ends, said upright walls and said cap member cooperating with the portion of the roof between said upright walls to form a ventilator having a gas inlet opening in the roof and substantially closed at its bottom against the entrance of external air in material volume, and having gas outlet passages between said cap member and said upright side walls, and baffles in said gas outlet passages arranged transversely of the latter between the upright side walls and the sides of the cap member intermediate the ends of the latter and extending above the end walls of said gas outlet passages and for a substantial distance below the sides of the said cap member to intercept air flowing lengthwise of said gas outlet passages and deflect said air upwardly.

In testimony whereof, I have signed my name to this specification.

RALPH ST. LAWRENCE PEVERLEY.